United States Patent
Hsieh et al.

(10) Patent No.: US 10,920,687 B2
(45) Date of Patent: Feb. 16, 2021

(54) SPARK IGNITION ENGINE CONTROL WITH EXHAUST MANIFOLD PRESSURE SENSOR

(71) Applicant: Cummins Inc., Columbus, IN (US)

(72) Inventors: Ming-Feng Hsieh, Nashville, IN (US); Andrew G. Kitchen, Daventry (GB); Axel Otto zur Loye, Columbus, IN (US); Jinghua Zhong, Bloomington, IN (US); Richard A. Booth, Columbus, IN (US); Robert J. Thomas, Indianapolis, IN (US); Jisang Sun, Columbus, IN (US)

(73) Assignee: Cummins Inc.

( * ) Notice: Subject to any disclaimer, the term of this patent is extended or adjusted under 35 U.S.C. 154(b) by 715 days.

(21) Appl. No.: 15/351,721

(22) Filed: Nov. 15, 2016

(65) Prior Publication Data

US 2018/0135541 A1    May 17, 2018

(51) Int. Cl.
*G06G 7/70* (2006.01)
*F02D 37/02* (2006.01)
*F02P 5/145* (2006.01)
*F02D 41/14* (2006.01)
*F02D 41/00* (2006.01)
*F02B 37/16* (2006.01)
*F02B 37/18* (2006.01)
*F02B 37/24* (2006.01)
*F02D 41/18* (2006.01)

(52) U.S. Cl.
CPC .............. *F02D 37/02* (2013.01); *F02B 37/16* (2013.01); *F02B 37/18* (2013.01); *F02B 37/24* (2013.01); *F02D 41/0007* (2013.01); *F02D 41/146* (2013.01); *F02D 41/1446* (2013.01); *F02D 41/1448* (2013.01); *F02D 41/1462* (2013.01); *F02D 41/18* (2013.01); *F02P 5/145* (2013.01); *F02D 2041/001* (2013.01); *F02D 2200/1002* (2013.01); *Y02T 10/12* (2013.01)

(58) Field of Classification Search
CPC .. F02D 37/02; F02D 41/0007; F02D 41/1446; F02D 41/1448; F02D 41/146; F02D 41/1462; F02D 41/18; F02D 2041/001; F02D 2200/1002; F02B 37/16; F02B 37/18; F02B 37/24; F02P 5/145; Y02T 10/144
USPC ....................................................... 701/102
See application file for complete search history.

(56) References Cited

U.S. PATENT DOCUMENTS 5,949,146 A * 9/1999 VandenBerghe ........ F02B 63/04
                                                  123/339.19
6,378,515 B1   4/2002  Geyer
(Continued)

FOREIGN PATENT DOCUMENTS

WO      2014189528      11/2014

*Primary Examiner* — Hung Q Nguyen
*Assistant Examiner* — Anthony Donald Taylor, Jr.
(74) *Attorney, Agent, or Firm* — Taft Stettinius & Hollister LLP

(57) ABSTRACT

Control of a spark ignited internal combustion in response to an exhaust manifold pressure measurement of an engine is disclosed. An engine out NOx amount for at least one cylinder is determined at least in part in response to the exhaust manifold pressure measurement and a brake mean effective pressure of the at least one cylinder. An operating condition of the engine is adjusted in response to the engine out NOx amount.

16 Claims, 4 Drawing Sheets

(56) References Cited

U.S. PATENT DOCUMENTS

| | | |
|---|---|---|
| 6,697,729 B2 | 2/2004 | Wright |
| 6,775,623 B2 * | 8/2004 | Ali .................... F02D 41/1462 |
| | | 702/31 |
| 6,820,599 B2 * | 11/2004 | Kurtz ...................... F02B 1/12 |
| | | 123/568.21 |
| 6,882,929 B2 | 4/2005 | Liang et al. |
| 7,778,766 B1 | 8/2010 | Cowgill et al. |
| 8,281,572 B2 * | 10/2012 | Chi ........................ F01N 3/106 |
| | | 60/286 |
| 8,301,356 B2 | 10/2012 | Wang et al. |
| 8,453,431 B2 | 6/2013 | Wang et al. |
| 8,505,278 B2 * | 8/2013 | Farrell ................. F01N 3/0205 |
| | | 60/285 |
| 8,694,197 B2 * | 4/2014 | Rajagopalan ......... F02D 41/146 |
| | | 701/104 |
| 8,700,291 B2 | 4/2014 | Herrmann |
| 8,762,626 B2 | 6/2014 | Wolfe et al. |
| 8,942,912 B2 | 1/2015 | Wang et al. |
| 2004/0255882 A1 * | 12/2004 | Branyon ................ F02B 33/22 |
| | | 123/70 R |
| 2005/0222748 A1 * | 10/2005 | Naik ................... F02D 41/0275 |
| | | 701/103 |
| 2006/0042587 A1 * | 3/2006 | Ellinger .................... B60K 6/48 |
| | | 123/305 |
| 2016/0103110 A1 * | 4/2016 | Lack ...................... F02D 41/14 |
| | | 702/24 |
| 2016/0160785 A1 * | 6/2016 | Basu ...................... F01N 3/208 |
| | | 701/104 |
| 2017/0051707 A1 * | 2/2017 | Wright .................. F02M 26/46 |

* cited by examiner

SPARK IGNITION ENGINE CONTROL WITH EXHAUST MANIFOLD PRESSURE SENSOR

FIELD OF THE INVENTION

The present invention relates generally to spark ignited engines, and more particularly is concerned with NOx estimation and control of spark ignited engine operations in response to exhaust manifold pressure outputs from an exhaust manifold pressure sensor.

BACKGROUND

A spark ignited engine can employ NOx feedback to control spark timing, lambda, and/or air-fuel ratio (AFR) in the engine cylinders. Typically a physical NOx sensor that measures engine-out NOx is used on most applications. However, for certain applications, such as those that employ an aggressive fuel, such as type D fuel, the NOx sensor has a very short useful life and is not recommended or desirable for use.

One alternative method to employing a physical NOx sensor involves determining NOx with a "virtual" NOx sensor. One virtual NOx sensor technique involves a torque over boost (TOB) determination for NOx estimation. One example of TOB NOx estimation is provided in U.S. Pat. No. 5,949,146, which is incorporated herein by reference.

TOB is determined by the brake mean effective pressure (BMEP) (or torque output or braking power of the engine) times the ratio of the intake manifold temperature (IMT) to the intake manifold pressure (IMP). However, TOB NOx estimation may not provide the desired accuracy or robustness for the control system to provide the desired system performance, particularly as NOx limits decrease. For example, as engine-out limits decrease, the uncertainty in the estimation in the engine out NOx amount may result in operating condition adjustments that cause an engine out NOx amount occurring that is lower than a threshold amount, resulting in a lambda below a lean limit and high coefficient of variation (COV) of cylinder gross indicated mean effective pressure (GIMEP) and misfire.

Other methods for controlling emissions targets and engine operations, such as those that employ targeting an air-fuel ratio or lambda, also suffer from deficiencies due to various conditions such as variation in fuel composition, fuel quality, and humidity, and also due to sensor drift error and sensor condition deterioration over time. In addition, pumping mean effective pressure (PMEP) estimates employed in engine controls that are made without an exhaust manifold pressure sensor suffer from uncertainties due to waste gate position, variable geometry turbine inlet position, and variable valve timing and cam phaser position. Thus, there remains a need for additional improvements in systems and methods for NOx estimation and in the control spark ignited engine operations.

SUMMARY

Unique systems, methods and apparatus are disclosed for controlling operation of a spark ignited internal combustion in response to an exhaust manifold pressure measurement of the engine. In one embodiment, an engine out NOx amount for at least one cylinder is determined at least in part in response to the exhaust manifold pressure measurement and a BMEP of the at least one cylinder. An operating condition of the engine is adjusted in response to the engine out NOx amount.

In another embodiment, the exhaust manifold pressure determination is employed to determine a mass charge flow which approximates trapped air mass in the at least one cylinder, and a traditional TOB determination of the engine out NOx amount is modified by replacing the IMP and IMT inputs in the TOB determination with the mass charge flow to estimate the engine out NOx amount in response to a ratio of the BMEP to the mass charge flow, and also in response to the exhaust manifold pressure and the spark timing.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
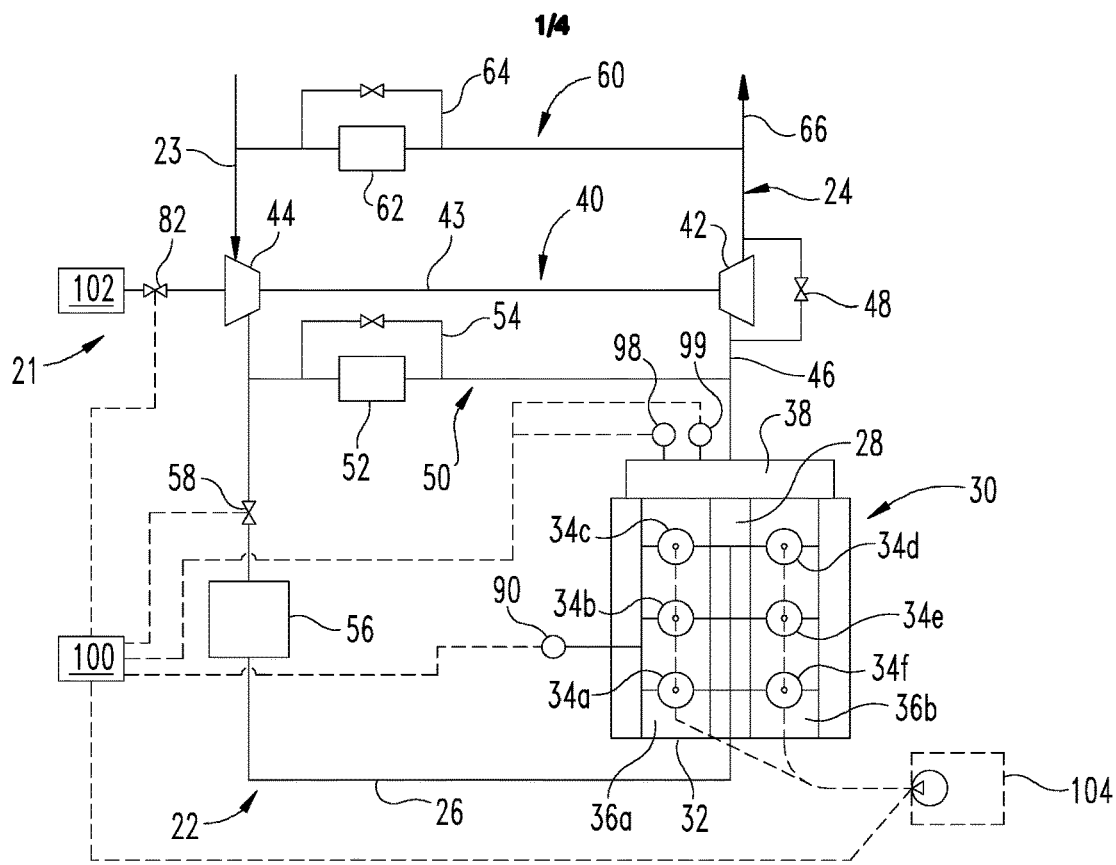
FIG. 1 is a schematic illustration of a portion of an internal combustion engine system with an exhaust manifold pressure sensor.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, an internal combustion engine system 20 is illustrated in schematic form. A fueling system 21 is also shown in schematic form that is operable with internal combustion engine system 20 to provide fueling for engine 30 from a first fuel source 102. In one embodiment, only one fuel source 102 is provided and fuel source 102 is located so that the fuel is pre-mixed with the charge flow upstream of the combustion chambers of engine cylinders. In another embodiment, the fuel from first fuel source 102 is injected directly into the cylinder(s) via direct injection or via port injection. In yet another embodiment, fueling system 21 includes an optional second fuel source 104 for also providing fueling, and internal combustion engine system 20 is a dual fuel system.

Internal combustion engine system 20 includes engine 30 connected with an intake system 22 for providing a charge flow to engine 30 and an exhaust system 24 for output of exhaust gases in an exhaust flow. In certain embodiments, the engine 30 includes a spark ignited internal combustion engine in which a gaseous fuel flow is pre-mixed with the charge flow from first fuel source 102. The gaseous fuel can be, for example, natural gas, bio-gas, methane, propane, ethanol, producer gas, field gas, liquefied natural gas, compressed natural gas, or landfill gas.

In another embodiment, engine 30 includes a lean combustion engine such as a diesel cycle engine that uses a liquid fuel in second fuel source 104 such as diesel fuel as the sole fuel source, or in combination with a gaseous fuel in first fuel source 102 such as natural gas. However, other types of liquid and gaseous fuels are not precluded, such as any suitable liquid fuel and gaseous fuel. In the illustrated embodiment, the engine 30 includes six cylinders 34a-34f in a two cylinder bank 36a, 36b arrangement. However, the number of cylinders (collectively referred to as cylinders 34) may be any number, and the arrangement of cylinders 34 unless noted otherwise may be any arrangement including an in-line arrangement, and is not limited to the number and arrangement shown in FIG. 1.

Engine 30 includes an engine block 32 that at least partially defines the cylinders 34. A plurality of pistons, such as piston 70 shown in FIG. 2, may be slidably disposed within respective cylinders 34 to reciprocate between a top-dead-center position and a bottom-dead-center position while rotating a crankshaft 78. Each of the cylinders 34, its respective piston 70, and the cylinder head 72 form a combustion chamber 74. One or more intake valves, such an intake valve 92, and one or more exhaust valves, such as exhaust valve 94, are moved between open and closed positions by a conventional valve control system, cam phaser, or a variable valve timing system, to control the flow of intake air or air/fuel mixture into, and exhaust gases out of, the cylinder 34, respectively.

Figure 2:
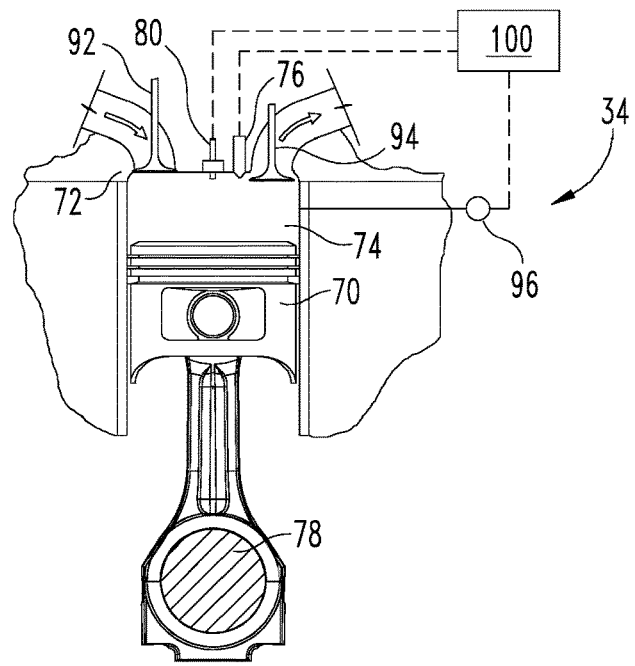
FIG. 2 is a schematic illustration of a cylinder of the internal combustion engine system of FIG. 1.

FIG. 2 shows a single engine cylinder 34 of the multi-cylinder reciprocating piston type engine shown in FIG. 1. The control system of the present invention could be used to control fuel delivery and combustion in an engine having only a single cylinder or any number of cylinders, for example, a four, six, eight or twelve cylinder or more internal combustion engine. In addition, control system may be adapted for use on any internal combustion engine having compression, combustion and expansion events, including a rotary engine, two stroke cycle engines, four stroke cycle engines, N stroke cycle engines, HCCI engine, PCCI engines, and a free piston engine. In other embodiments system 20 includes a motor/generator and an energy storage system configured to provide hybrid operations in which power is selectively provided by the engine, the energy storage system and motor/generator, and combinations of these. The control system of the present invention may also be employed with any suitable ignition system, including spark plug 80, diesel pilot ignition, plasma, laser, passive or fuel fed pre-chamber, and integrated pre-chamber spark plug ignition systems, for example.

The control system may further include a cylinder sensor 96 for sensing or detecting an engine operating condition indicative of the combustion in combustion chamber 74 and generating a corresponding output signal to controller 100. Cylinder sensor 96 permits effective combustion control capability by detecting an engine operating condition or parameter directly related to, or indicative of, the combustion event in cylinder 34 during the compression and/or expansion strokes. For example, cylinder sensor 96 can measure cylinder pressure (average or peak), knock intensity, start of combustion, combustion rate, combustion duration, crank angle at which peak cylinder pressure occurs, combustion event or heat release placement, effective expansion ratio, a parameter indicative of a centroid of heat release placement, location and start/end of combustion processes, lambda, and/or an oxygen amount.

In one embodiment, engine 30 is a four stroke engine. That is, for each complete engine combustion cycle (i.e., for every two full crankshaft 78 rotations), each piston 74 of each cylinder 34 moves through an intake stroke, a compression stroke, a combustion or power stroke, and an exhaust stroke. Thus, during each complete combustion cycle for the depicted six cylinder engine, there are six strokes during which air is drawn into individual combustion chambers 74 from intake supply conduit 26 and six strokes during which exhaust gas is supplied to exhaust manifold 38. As discussed further below, the present invention measures an exhaust manifold pressure with at least one exhaust manifold pressure sensor 98 at one or more locations in exhaust manifold 38 and determines an estimate of the NOx output from the one or more cylinders 34 based at least in part on the exhaust manifold pressure.

The engine 30 includes cylinders 34 connected to the intake system 22 to receive a charge flow and connected to exhaust system 24 to release exhaust gases produced by combustion of the fuel(s). Exhaust system 24 may provide exhaust gases to a turbocharger 40, although a turbocharger is not required. In still other embodiments, multiple turbochargers are included to provide high pressure and low pressure turbocharging stages that compress the intake flow.

Furthermore, exhaust system 24 can be connected to intake system 22 with one or both of a high pressure exhaust gas recirculation (EGR) system 50 and a low pressure EGR system 60. EGR systems 50, 60 may include a cooler 52, 62 and bypass 54, 64, respectively. In other embodiments, one or both of EGR systems 50, 60 are not provided. When provided, EGR system(s) 50, 60 provide exhaust gas recirculation to engine 30 in certain operating conditions. In any EGR arrangement during at least certain operating conditions, at least a portion the exhaust output of cylinder(s) 34 is recirculated to the engine intake system 22.

In the high pressure EGR system 50, the exhaust gas from the cylinder(s) 34 takes off from exhaust system 24 upstream of turbine 42 of turbocharger 40 and combines with intake flow at a position downstream of compressor 44 of turbocharger 40 and upstream of an intake manifold 28 of engine 30. In the low pressure EGR system 60, the exhaust gas from the cylinder(s) 34a-34f takes off from exhaust system 24 downstream of turbine 42 of turbocharger 40 and combines with intake flow at a position upstream of compressor 44 of turbocharger 40. The recirculated exhaust gas may combine with the intake gases in a mixer (not shown) of intake system 22 or by any other arrangement. In certain embodiments, the recirculated exhaust gas returns to the intake manifold 28 directly. In yet another embodiment, the system 20 includes a dedicated EGR loop in which exhaust gas from one or more, but less than all, of cylinders 34 is dedicated solely to EGR flow during at least some operating conditions.

Intake system 22 includes one or more inlet supply conduits 26 connected to an engine intake manifold 28, which distributes the charge flow to cylinders 34 of engine 30. Exhaust system 24 is also coupled to engine 30 with engine exhaust manifold 38. Exhaust system 24 includes an exhaust conduit 46 extending from exhaust manifold 32 to an exhaust valve. In the illustrated embodiment, exhaust conduit 46 extends to turbine 42 of turbocharger 40. Turbine 42 may include a valve such as controllable waste gate 48 or other suitable bypass that is operable to selectively bypass at least a portion of the exhaust flow from turbine 42 to reduce boost pressure and engine torque under certain operating conditions. In another embodiment, turbine 42 is a variable geometry turbine with a size-controllable inlet opening. In another embodiment, the exhaust valve is an exhaust throttle that can be closed or opened. Turbocharger 40 may also include multiple turbochargers. Turbine 42 is connected via a shaft 43 to compressor 44 that is flow coupled to inlet supply conduit 26.

An aftertreatment system (not shown) can be connected with an outlet conduit 66. The aftertreatment system may include, for example, oxidation devices (DOC), particulate removing devices (PF, DPF, CDPF), constituent absorbers or reducers (SCR, AMOX, LNT), reductant systems, and other components if desired. In one embodiment, exhaust conduit 46 is flow coupled to exhaust manifold 32, and may also include one or more intermediate flow passages, conduits or other structures. Exhaust conduit 46 extends to turbine 42 of turbocharger 40.

Compressor 44 receives fresh air flow from intake air supply conduit 23. Fuel source 102 may also be flow coupled at or upstream of the inlet to compressor 44 which provides a pre-mixed charge flow to cylinders 34. Intake system 22 may further include a compressor bypass (not shown) that connects a downstream or outlet side of compressor 44 to an upstream or inlet side of compressor 44. Inlet supply conduit 26 may include a charge air cooler 56 downstream from compressor 44 and intake throttle 58. In another embodiment, a charge air cooler 56 is located in the intake system 22 upstream of intake throttle 58. Charge air cooler 56 may be disposed within inlet air supply conduit 26 between engine 30 and compressor 44, and embody, for example, an air-to-air heat exchanger, an air-to-liquid heat exchanger, or a combination of both to facilitate the transfer of thermal energy to or from the flow directed to engine 30.

In operation of internal combustion engine system 20, fresh air is supplied through inlet air supply conduit 23. The fresh air flow or combined flows can be filtered, unfiltered, and/or conditioned in any known manner, either before or after mixing with the EGR flow from EGR systems 50, 60 when provided. The intake system 22 may include components configured to facilitate or control introduction of the charge flow to engine 30, and may include intake throttle 58, one or more compressors 44, and charge air cooler 56. The intake throttle 58 may be connected upstream or downstream of compressor 44 via a fluid passage and configured to regulate a flow of atmospheric air and/or combined air/EGR flow to engine 30. Compressor 44 may be a fixed or variable geometry compressor configured to receive air or air and fuel mixture from fuel source 102 and compress the air or combined flow to a predetermined pressure level before engine 30. The charge flow is pressurized with compressor 44 and sent through charge air cooler 56 and supplied to engine 30 through intake supply conduit 26 to engine intake manifold 28.

Fuel system 21 is configured to provide either fuelling from a single fuel source, such as first fuel source 102 or second fuel source 104. In another embodiment, dual fuelling of engine 30 from both of fuel sources 102, 104 is provided. In one dual fuel embodiment, fuel system 21 includes first fuel source 102 and second fuel source 104. First fuel source 102 is connected to intake system 22 with a mixer or connection at or adjacent an inlet of compressor 44. Second fuel source 104 is configured to provide a flow of liquid fuel to cylinders 34 with one or more injectors at or near each cylinder. In certain embodiments, the cylinders 34 each include at least one direct injector 76 for delivering fuel to the combustion chamber 74 thereof from a liquid fuel source, such as second fuel source 104. In addition, at least one or a port injector at each cylinder or a mixer at an inlet of compressor 44 can be provided for delivery or induction of fuel from the first fuel source 102 with the charge flow delivered to cylinders 34.

A direct injector, as utilized herein, includes any fuel injection device that injects fuel directly into the cylinder volume (combustion chamber), and is capable of delivering fuel into the cylinder volume when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 34, such as the illustrated cylinders 34 in FIG. 2, may include one or more direct injectors 76 in the duel fuel engine embodiment. The direct injectors 76 may be the primary fueling device for liquid fuel source 104 for the cylinders 34.

A port injector, as utilized herein, includes any fuel injection device that injects fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 34 may include one or more port injectors (not shown). In one embodiment, the port injectors may be the primary fueling device for first fuel source 102 to the cylinders 34. In another embodiment, the first fuel source 102 can be connected to intake system 22 with a mixer upstream of intake manifold 28, such as at the inlet or upstream of compressor 44.

In certain dual fuel embodiments, each cylinder 34 includes at least one direct injector that is capable of providing all of the designed primary fueling amount from liquid fuel source 104 for the cylinders 34 at any operating condition. First fuel source 102 provides a flow of a gaseous fuel to each cylinder 34 through a port injector or a natural gas connection upstream of intake manifold 28 to provide a second fuel flow (in the dual fuel embodiment) or the sole fuel flow (in a single fuel source embodiment) to the cylinders 34 to achieve desired operational outcomes.

In the dual fuel embodiment, the fueling from the second, liquid fuel source 104 is controlled to provide the sole fueling at certain operating conditions of engine 30, and fueling from the first fuel source 102 is provided to substitute for fueling from the second fuel source 104 at other operating conditions to provide a dual flow of fuel to engine 30. In the dual fuel embodiments where the first fuel source 102 is a gaseous fuel and the second fuel source 104 is a liquid fuel, a control system including controller 100 is configured to control the flow of liquid fuel from second fuel source 104 and the flow of gaseous fuel from first fuel source 102 in accordance with engine speed, engine loads, intake manifold pressures, and fuel pressures, for example. In single fuel embodiments where the sole fuel source 102 is a gaseous fuel, a control system including controller 100 is configured to control the flow of gaseous fuel from first fuel source 102 in accordance with engine speed, engine loads, intake manifold pressures, and fuel pressures, for example. In single fuel embodiments where the sole fuel source 104 is a liquid fuel, a control system including controller 100 is configured to control the flow of liquid fuel from second fuel source 104 in accordance with engine speed, engine loads, intake manifold pressures, and fuel pressures, for example.

One embodiment of system 20 shown in FIG. 2 includes each of the cylinders 34 with a direct injector 76 (in dual fuel embodiment) and/or a spark plug 80, associated with each of the illustrated cylinders 34a-34f of FIG. 1. Direct injectors 76 are electrically connected with controller 100 to receive fueling commands that provide a fuel flow to the respective cylinder 34 in accordance with a fuel command determined according to engine operating conditions and operator demand by reference to fueling maps, control algorithms, or other fueling rate/amount determination source stored in controller 100. Spark plugs 80 are electrically connected with controller 100 to receive spark or firing commands that provide a spark in the respective cylinder 34 in accordance with a spark timing command determined according to engine operating conditions and operator demand by reference to fueling maps, control algorithms, or other fueling rate/amount determination source stored in controller 100.

Each of the direct injectors 76 can be connected to a fuel pump (not shown) that is controllable and operable to provide a flow or fuel from second fuel source 104 to each of the cylinders 34 in a rate, amount and timing determined by controller 100 that achieves a desired torque and exhaust output from cylinders 34. The fuel flow from first fuel source 102 can be provided to an inlet of compressor 44 or to port injector(s) upstream of cylinders 34. A shutoff valve 82 can be provided in fuel line 108 and/or at one or more other locations in fuel system 21 that is connected to controller 100. The gaseous fuel flow is provided from first fuel source 102 in an amount determined by controller 100 that achieves a desired torque and exhaust output from cylinders 34.

Controller 100 can be connected to actuators, switches, or other devices associated with fuel pump(s), shutoff valve 82, intake throttle 58, waste gate 48 or an inlet to a VGT or an exhaust throttle, spark plugs 80, and/or injectors 76 and configured to provide control commands thereto that regulate the amount, timing and duration of the flows of the gaseous and/or liquid fuels to cylinders 34, the charge flow, and the exhaust flow to provide the desired torque and exhaust output in response to an estimated NOx amount based at least in part on the measured exhaust manifold pressure and a predetermined engine out NOx limit.

In addition, controller 100 can be connected to physical and/or virtual engine sensor(s) 90 to detect, measure and/or estimate one or more engine operating conditions outside of cylinders 34 such as IMT, IMP, mass charge flow (MCF), EGR flow, an oxygen amount or lambda in the exhaust, engine speed, engine torque, spark timing, waste gate or turbine inlet position, and other operating conditions. Controller 100 can also be connected to exhaust manifold pressure sensor 98 to detect or measure an exhaust manifold pressure so that an engine out NOx amount can be estimated that is determined at least in part in response to the exhaust manifold pressure measured by EMP sensor 98 during operation of engine 30.

As discussed above, the positioning of each of the actuators, switches, or other devices associated with fuel pump(s), shutoff valve 82, intake throttle 58, waste gate 48 or an inlet to a VGT or an exhaust throttle, spark plug(s) 80, injector(s) 76, intake and/or intake valve opening mechanisms, cam phasers, etc. can be controlled via control commands from controller 100. In certain embodiments of the systems disclosed herein, controller 100 is structured to perform certain operations to control engine operations and fueling of cylinders 34 with fueling system 21 to provide the desired engine speed, torque outputs, spark timing, lambda, and other outputs or adjustments in response to the exhaust manifold pressure measurement from EMP sensor 98.

In certain embodiments, the controller 100 forms a portion of a processing subsystem including one or more computing devices having memory, processing, and communication hardware. The controller 100 may be a single device or a distributed device, and the functions of the controller 100 may be performed by hardware or software. The controller 100 may be included within, partially included within, or completely separated from an engine controller (not shown). The controller 100 is in communication with any sensor or actuator throughout the systems disclosed herein, including through direct communication, communication over a datalink, and/or through communication with other controllers or portions of the processing subsystem that provide sensor and/or actuator information to the controller 100.

The controller 100 includes stored data values, constants, and functions, as well as operating instructions stored on computer readable medium. Any of the operations of exemplary procedures described herein may be performed at least partially by the controller. Other groupings that execute similar overall operations are understood within the scope of the present application. Modules may be implemented in hardware and/or on one or more computer readable media, and modules may be distributed across various hardware or computer implemented. More specific descriptions of certain embodiments of controller operations are discussed herein in connection with FIGS. 3 and 5-6. Operations illustrated are understood to be exemplary only, and operations may be combined or divided, and added or removed, as well as re-ordered in whole or in part.

Certain operations described herein include operations to interpret or determine one or more parameters. Interpreting or determining, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

Figure 3:
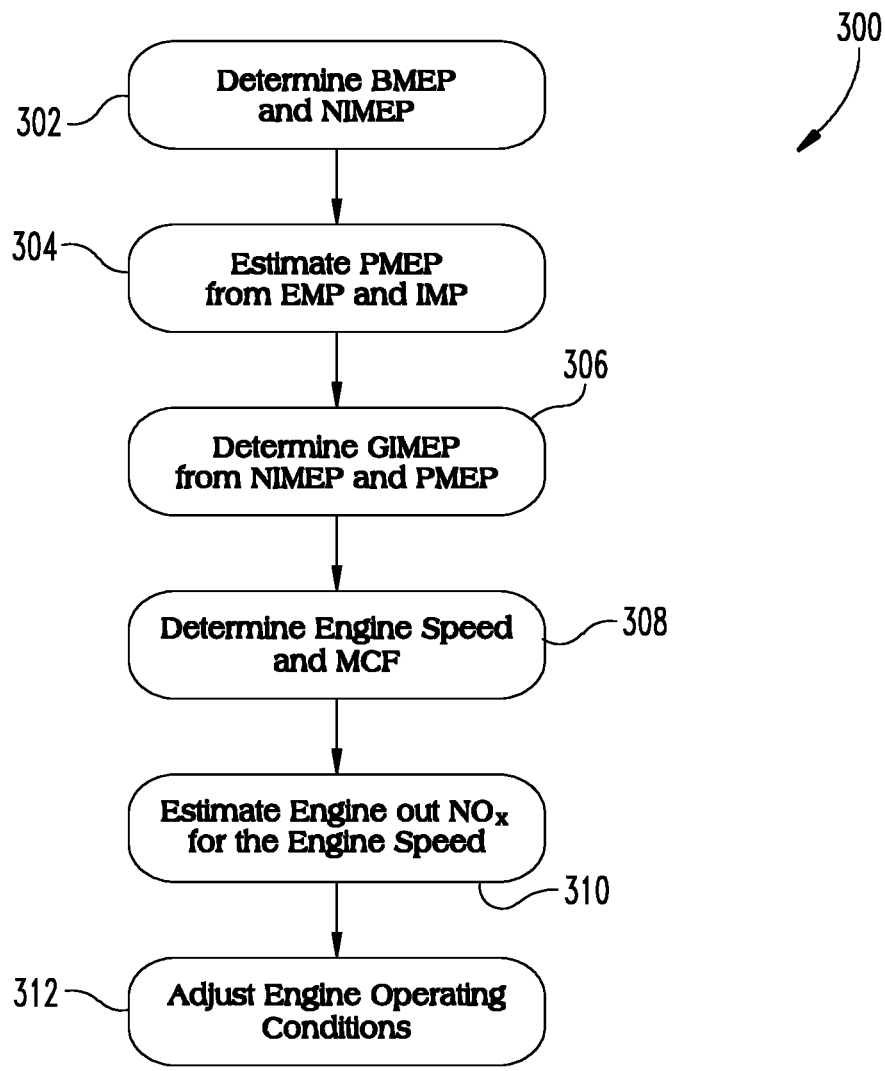
FIG. 3 is a flow diagram of an example procedure for controlling operation of the internal combustion engine in response to exhaust manifold pressure.

In one embodiment, controller 100 is configured to perform a procedure 300 such as shown in FIG. 3 for operating a virtual engine out NOx sensor. Engine out NOx concentration is directly correlated to adiabatic flame temperature (AFT), which is the temperature of complete combustion products in the constant volume combustion process without doing work, no heat transfer, or changes in kinetic or potential energy. The mean in-cylinder AFT can be predicted based on gross power, which can be represented by GIMEP, and in-cylinder trapped air mass, which can be represented by the mass charge flow (MCF) and cylinder trapped air mass. In addition, NOx is affected by peak AFT, which is based on the centroid of heat release location. Therefore engine out NOx estimates are determined as a function of peak AFT, which is a function of the ratio of GIMEP to MCF, and also the centroid of heat release (which is related to combustion or spark timing), as follows:

$$NOx = f(GIMEP/MCF, centroid) \qquad \text{Equation 1}$$

Procedure 300 uses an EMP measurement from EMP sensor 98 to estimate GIMEP based on a measured or estimated BMEP and PMEP, where PMEP is the difference between the EMP and IMP. With GIMEP instead of BMEP in the NOx estimation, engine out NOx estimation is more accurate and more robust to uncertainties caused by waste gate positioning, cam phaser positioning, exhaust back pressure, turbo degradation, and other component uncertainties and wear since the pressure in the exhaust manifold is directly measured by EMP sensor 98.

In one embodiment, procedure 300 includes an operation 302 to determine BMEP in response to an indicated torque or horsepower and displacement volume of engine 30 and to determine net indicated mean effective pressure (NIMEP). The NIMEP is determined from the sum of BMEP (brake power) and friction mean effective pressure (FMEP). Since FMEP is a function of engine power in general, it can be estimated by BMEP, IMP and EMP. Procedure 300 continues at operation 304 to receive an exhaust manifold pressure measurement input from EMP sensor 98 and estimate PMEP as the difference between the EMP and the IMP. Procedure 300 continues at operation 306 to determine the GIMEP from the sum of the NIMEP and the PMEP.

With the determination of GIMEP, procedure 300 continues at operation 308 to determine the engine speed and mass charge flow (MCF) and residual mass from engine sensor(s) 90. Procedure 300 further continues at operation 310 to estimate an engine out NOx amount for the measured engine speed based on a ratio of the GIMEP to mass charge flow since NOx is directly correlated to this ratio. Procedure 300 continues at operation 312 to adjust one or more operating conditions of engine system 20 in response to the estimated engine out NOx amount to meet a targeted performance, such as an emissions target.

In addition to providing a more robust virtual sensor estimation of engine out NOx amount due to basing the determination at least in part on GIMEP, the exhaust manifold pressure measurement from EMP sensor 98 also improves the volumetric efficiency calculation that can be used to estimate the mass charge flow. In addition, the EMP changes with the residual mass charge flow changes, which allows the engine out NOx estimate to account for charge flow temperature effects, diluent effects, volumetric-efficiency effects, and charge uniformity effects.

Figure 4:
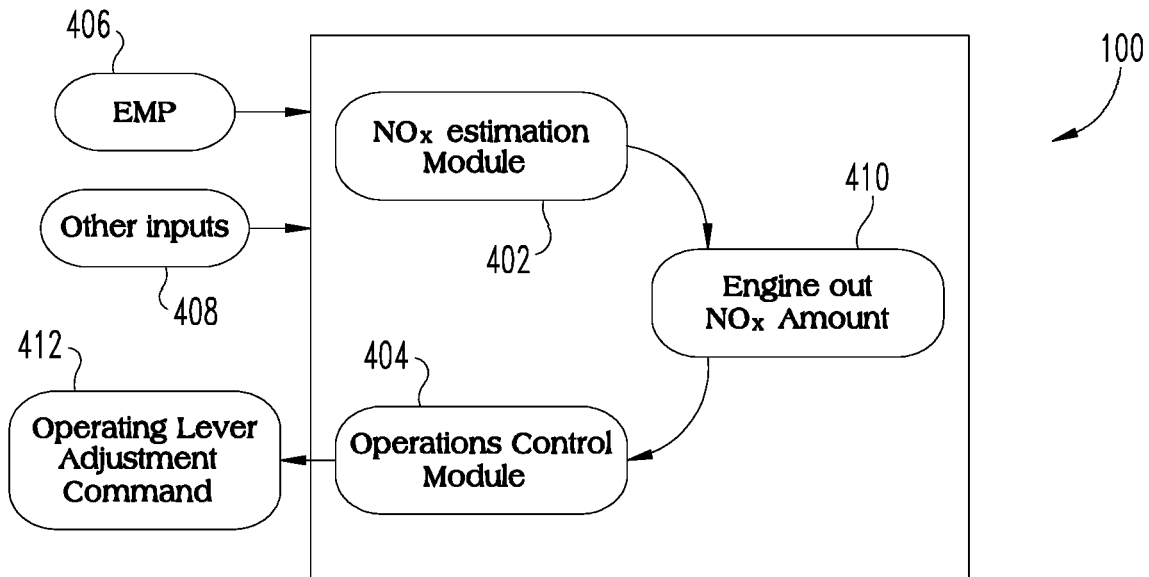
FIG. 4 is a schematic illustration of a controller apparatus.

Referring to FIG. 4, there is shown one embodiment of a controller apparatus such as controller 100 which includes a NOx estimation module 402 and an operations control module 404. NOx estimation module 402 receives an EMP sensor input 406 from EMP sensor 98 and other inputs (virtual and/or physical) 408 from engine sensor(s) 90 and/or cylinder sensor(s) 96. NOx estimation module 402 is configured to determine an estimated engine out NOx amount 410 for one or more cylinders 34 in response to inputs 406, 408.

In one embodiment, NOx estimation module 402 is configured to determine BMEP in response to an indicated torque or horsepower and displacement volume, and also to determine NIMEP based on BMEP. NOx estimation module 402 also determines PMEP from the EMP input 406 and an IMP input. NOx estimation module 402 also determines the GIMEP from the sum of the NIMEP and the PMEP, and also to determine MCF. The engine out NOx amount is estimated for a determined engine speed based on a ratio of the GIMEP to mass charge flow since NOx is directly correlated to this ratio. Operations control module 404 is configured to receive the engine out NOx amount and output an operating lever adjustment command 412 to meet or maintain an engine operating performance target and/or emissions target.

In operation 312 and/or operating lever adjustment command 412, the adjustment in the one or more operating conditions and/or operating lever adjustment includes, for example, adjusting at least one operating lever of system 20 associated with one or more of the lambda and spark timing in order to deliver one or more of a target engine out NOx amount, a target knock margin, a target brake thermal energy (BTE), and/or a target coefficient of variance for the GIMEP. Levers of system 20 that effect the engine out NOx amount and that can be controlled in response to the estimated engine out NOx amount to meet a NOx target include one or more of IMT, humidity, spark timing, coolant temperature, compression ratio, intake/exhaust valve timing (opening and closing), swirl, lambda, air-fuel ratio, water injection, steam injection and membranes, for example.

Possible levers of system 20 that can be adjusted in response to the exhaust manifold pressure sensor measurement to control operations of engine system 20 to meet emissions or other performance targets may include, for example, valves, pumps and/or other actuators that control a fuel flow to cylinders 34 and/or an air flow to cylinders 34. Further example levers includes an intake air throttle position, a waste gate position, a turbine inlet opening size, a compressor bypass, variable valve actuator, a cam phaser, a variable valve timing, switching between multiple lift profiles/cams, compression braking, Miller cycling (early and/or late intake valve closing), cylinder bank cutout, cylinder cutout, intermittent cylinder deactivation, exhaust throttle, spark timing, IMT regulation, changing displacement of engine, changing number of strokes in cycle (e.g. 2 stroke vs. 4 stroke), pressure relief valve venting in the intake and/or exhaust, bypassing one or more of the compressors or turbines in a single stage turbocharger system or two stage turbocharger system or in a multiple turbine system, switching turbines in and out, and activating electrically activated turbocharging/supercharging, power-turbine (coupled to crank or alternator), turbo-compounding, exhaust throttle control downstream of one or more of the turbines, and EGR flow from one or more of a dedicated EGR, high pressure EGR loop, low pressure EGR loop, and internal EGR.

Other inputs 408 in addition to the exhaust manifold pressure sensor measurement from EMP sensor 98 are also contemplated at operations 302, 304 of procedure 300. Examples of other inputs include positions or indicators associated with a target throttle margin, WG, VGT, compressor bypass, VVA, cam phaser, spark timing, lambda, intake throttle, exhaust throttle, cylinder deactivation of one or more cylinders or cylinder banks, engine load, engine derate, addition of additional engines, stored power, TOB or NOx target, fuel flow, air flow, charge flow, EGR flow, compression ratio, valve events, fuel composition, water injection, IMT, IMP, jacket water temperature, engine speed, variable RPM of a genset, knock, low temperature coolant temperature (including inlet and outlet temperatures), high temperature coolant temperature (including inlet and outlet temperatures), RPM and RPM error, any error relative to target, kW load, combustion feedback, heat release, centroid of heat release, state of charge, EER, combustion rate (peak, etc.), cylinder pressure, peak cylinder pressure (PCP), PCP normalized by IMP, pressure ratio in cylinder, rate of pressure rise, cylinder pressure sensing, RPM based combustion feedback, knock sensor based combustion feedback, crankshaft twist based feedback, magnetostrictive torque sensors, strain gauge based cylinder pressure measurements, instrumented head bolts, instrumented gaskets, instrumented injector/plug hold-down bolts, ionization sensing, optical sensing, grid parallel, breaker status, island mode, transient compensation, load pickup, load shedding, compressor surge, engine protection, engine faults, misfire detection, charge pressure (IMP), water flow (for water injection), and any other engine sensors that quantify the operating condition.

In one embodiment of the procedures disclosed herein and/or of controller 100, the exhaust manifold pressure measurement from EMP sensor 98 is used in conjunction with the virtual sensors disclosed herein to determine an engine out NOx amount, and/or used to adjust the above described levers to meet a targeted engine performance, including emissions, power, combustion, knock and efficiency of engine operations.

Figure 5:
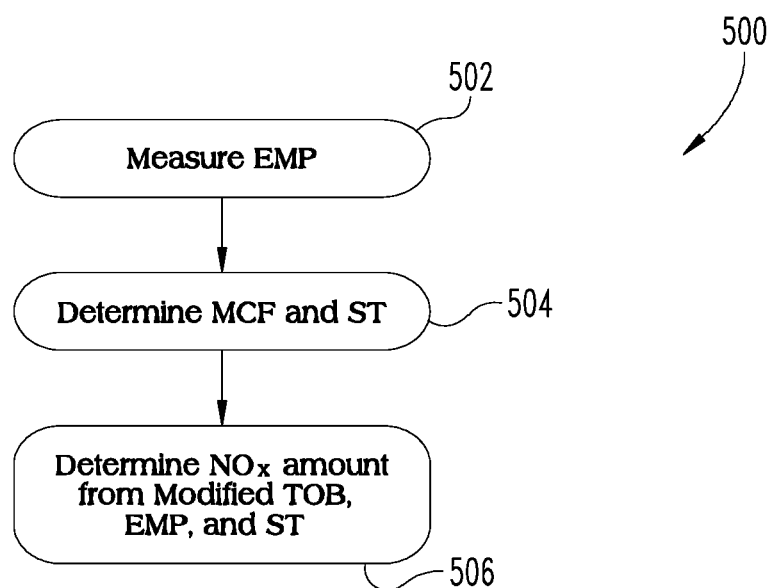
FIG. 5 is a flow diagram of another embodiment procedure for controlling operation of the internal combustion engine in response to exhaust manifold pressure.

Another embodiment procedure 500 shown in FIG. 5 in which an engine out NOx amount based on a modified TOB (indicated as TOB') is determined. Procedure 500 includes an operation 502 where an exhaust pressure manifold measurement from EMP sensor 98 is determined. Procedure 500 further continues at operation 504 to determine a MCF and spark timing.

Traditional TOB includes determining BMEP, IMT, and IMP as inputs to estimate TOB, and engine out NOx is a function of TOB, spark timing (ST) and waste gate position (WG), as follows:

$$TOB=\text{Brake Power}/(IMP/IMT) \quad \text{Equation 2}$$

$$NOx=f(TOB,ST,WG) \quad \text{Equation 3}$$

Brake power can be an output torque from engine 30, such as from operating tables, from a kW-load signal from an alternator, or any other suitable technique. Since EMP is a function of WG, and since MCF is a function of IMP/IMT, engine speed and volumetric efficiency, the determination of engine out NOx with a modified TOB can be improved as follows:

$$NOx=f(TOB',EMP,ST) \quad \text{Equation 4,}$$

In Equation 4, the IMP/IMT term in Equation 2 is replaced by MCF to determine TOB'.

Procedure 500 includes an operation 506 to determine an engine out NOx amount from TOB', EMP and ST. One or more operating levers of engine system 20 can then be adjusted as discussed above in response to the engine out NOx amount to adjust an operating condition of engine 30 in response to the engine out NOx amount.

In another embodiment of procedures 300, 500, the virtual estimate of the engine out NOx amount and the EMP measurement from EMP sensor 98 can be employed to balance NOx and knock. A NOx target can be achieved by adjusting engine operating levers to obtain different lambdas and spark timings. The performance of engine system 20 can be optimized by adjusting spark timing as needed to avoid knock conditions while staying within the NOx target.

Another approach of estimating NOx employs a "black box" model. The black box model can include, for example, regression equations, maps, neural network model, and other types of information. The black box model takes measurements of GIMEP, IMP, IMT, engine speed, spark timing, and EMP to estimate engine out NOx.

In another embodiment, the throttle margin is targeted with the waste gate position WG. The throttle margin is measured and compared to a target throttle margin. For a given engine speed and load and engine out NOx amount, there is a target WG that will deliver the desired throttle margin. This allows BTE to be maximized within the throttle margin requirements for stability. While this could be employed to meet targeted NOx without an EMP sensor, an EMP measurement from the EMP sensor 98 improves the accuracy of the virtual engine out NOx sensor.

In another embodiment, the systems and methods in which the virtual NOx sensor is included with EMP sensor 98 also includes a physical engine out NOx sensor 99 (FIG. 1). The physical engine out NOx sensor 99 is employed to determine engine out NOx unless one or more fault conditions are detected that indicate that the physical engine out NOx measurement is not accurate, such as, for example, the physical engine out NOx sensor 99 being too cold, defective, and/or providing unreasonable or unsteady measurements. In these fault conditions, the virtual NOx sensor with EMP sensor 98 is used to determine the engine out NOx amount as discussed above.

Figure 6:
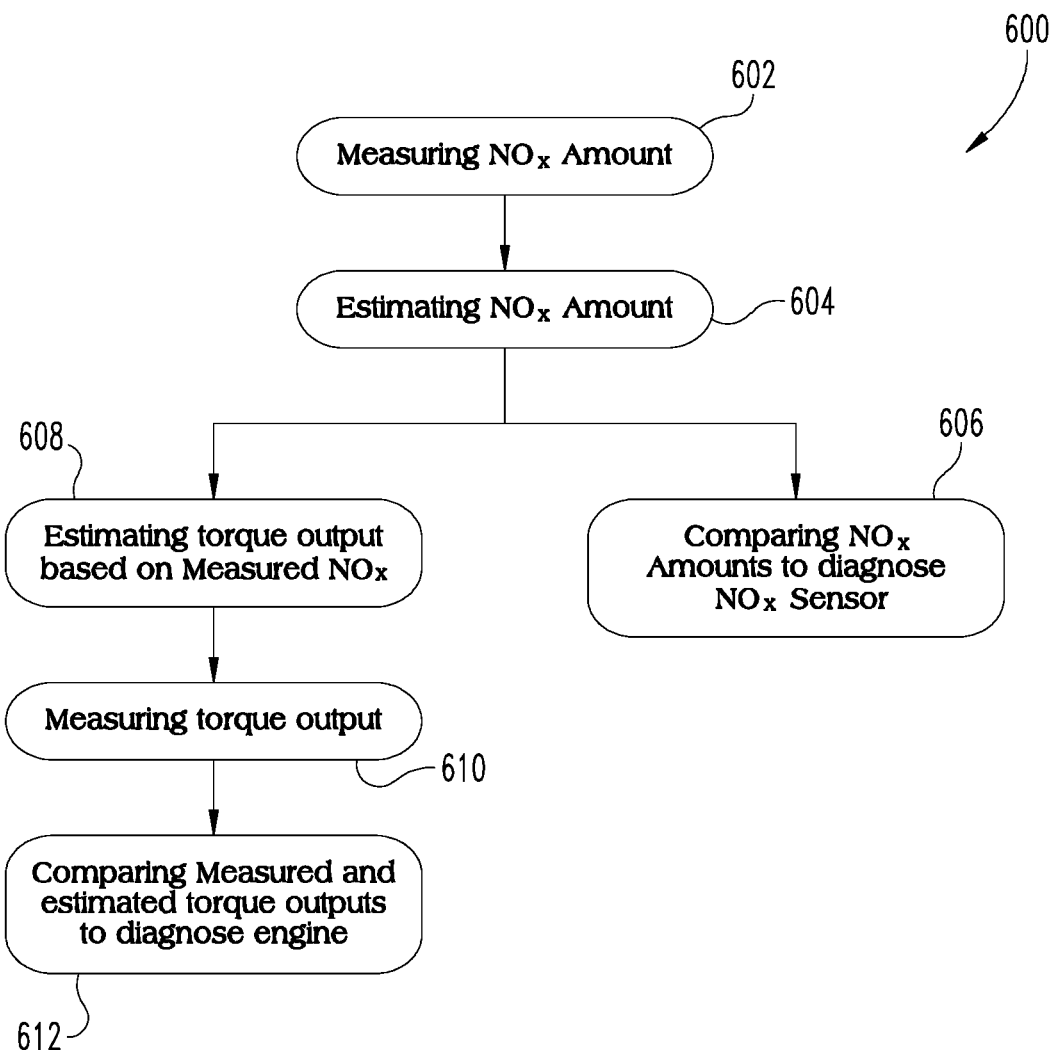
FIG. 6 is a flow diagram of other embodiment procedures for controlling operation of the internal combustion engine in response to exhaust manifold pressure.

In a further embodiment of the systems and methods disclosed herein, such as shown in FIG. 6, the virtual NOx sensor disclosed herein is employed for diagnostics/prognostics of physical NOx sensor 99, of another virtual NOx sensor, or of engine health. For example, the virtual NOx sensor is used to diagnose engine health by comparing expected values to estimated values. In one procedure 600, an engine out NOx amount is determined according to a traditional TOB analysis or from a measured NOx amount at operation 602. At operation 604, the engine out NOx amount is estimated based on exhaust manifold pressure. At operation 606 the measured and/or estimated NOx amounts are compared to one another and if the engine out NOx amounts differ by more than a threshold amount, a fault can be issued.

In another embodiment of procedure 600, the engine out NOx amount from a physical NOx sensor 99 and/or from the virtual NOx sensors discussed herein are used to estimate engine torque output at operation 608. The torque output of the engine is measured at operation 610. At operation 612 the measured and estimated torque outputs are compared to diagnose an engine condition. For example, if the estimated torque output differs from the measured torque output by more than a threshold amount, a fault can be issued.

Other diagnostic procedure embodiments include diagnostics of the waste gate 48 or of a cam phaser using the EMP measurement from EMP sensor 98. For example, a change in position of these components can be expected to produce a certain change in EMP, and a fault is issued is the actual change in EMP differs from the expected change in EMP by more than a threshold amount. In another procedure, a change in spark timing is expected to produce a certain response in EMP at a fixed throttle margin. If the actual EMP pressure change and expected pressure change differ by more than a threshold amount, a fault can be issued.

In another embodiment, the estimated engine out NOx amount is determined and an estimated lambda is compared to a measured lambda (with a lambda sensor). A determination about fuel quality can be made from the difference between the measured and estimated lambdas, and used to improve knock control. This determination could also be used to diagnose one or more fuel mass flow sensors, or improve a fuel mass flow estimate.

In another embodiment procedure, the measured EMP from EMP sensor 98 is used to determine PMEP at a given operating condition and compare it to an expected PMEP value at the operating condition. If the expected and estimated PMEP values differ by more than a threshold amount, a turbo degradation fault may be indicated. The accuracy of this approach could be improved with turbo speed sensing. This procedure can also be used to automatically recalibrate the engine if the turbocharger was changed (for example a different nozzle ring for improved altitude capability).

This measured PMEP determined from EMP sensor 98 and the IMP at the given operating condition also provides a way to estimate GIMEP. With measured PMEP from the EMP and IMP, MMEP is estimated. Since BMEP is measured, friction mean effective pressure (FMEP) can be determined. An increase in the FMEP over time can provide an indication of operating issues with engine 30 and an opportunity to determine or predict engine failures.

Various aspects of the systems and methods disclosed herein are contemplated. For example, one aspect relates to a method that includes operating an internal combustion engine system. The engine system includes an intake system connected to an engine with a plurality of cylinders and at least one fuel source operably connected to the internal combustion engine system to provide a flow of fuel to each of the plurality of cylinders. The intake system is coupled to each of the plurality of cylinders to provide a charge flow from the intake system to a combustion chamber of the respective cylinder. The internal combustion engine system further includes an exhaust system including an exhaust manifold. The method includes determining a pressure in the exhaust manifold during a combustion cycle associated with at least one of the plurality of cylinders; determining a BMEP in the exhaust manifold during the combustion cycle of the at least one of the plurality of cylinders; determining an engine out NOx amount for the at least one cylinder in response to the pressure in the exhaust manifold and the BMEP; and adjusting an operating condition of the at least one engine in response to the engine out NOx amount.

In one embodiment, the method includes determining a GIMEP of the at least one of the plurality of cylinders in response to the pressure in the exhaust manifold and the BMEP of the at least one cylinder and determining the engine out NOx amount for the at least one cylinder in response to the GIMEP. In a refinement of this embodiment, the GIMEP is determined in response to a sum of a PMEP and a MMEP. In a further refinement, the PMEP is determined in response to a differential between the pressure in the exhaust manifold and an intake manifold pressure, and the MMEP is based on the BMEP. In another refinement of the embodiment, the method includes determining a mass charge flow and a spark timing associated with the least one cylinder, and wherein determining the engine out NOx amount is based on a ratio of the GIMEP to the mass charge flow and the spark timing.

In another embodiment, the method includes comparing the engine out NOx amount from the at least one cylinder in response to an engine out NOx amount threshold and adjusting the operating condition of the engine to reduce the engine out NOx amount in response to the engine out NOx amount exceeding the engine out NOx amount threshold. In a refinement of this embodiment, adjusting the operating condition includes at least one of the following: opening or closing at least one of an intake throttle in the intake system, a compressor bypass valve in a compressor bypass, a waste gate of a turbine in the exhaust system, and a variable geometry turbine inlet in the exhaust system; and varying a lift profile of at least one of an intake valve and an exhaust valve of the cylinder.

In another embodiment, adjusting the operating condition includes adjusting a spark timing to avoid a knock condition in the at least one cylinder. In yet another embodiment, the method includes comparing the engine out NOx amount to a measured engine out NOx amount from the physical NOx sensor and diagnosing a condition of the physical NOx sensor in response to the comparison. In a refinement of this embodiment, the method includes estimating a torque output of the internal combustion engine in response to the measured engine out NOx amount; measuring a torque output of the internal combustion engine with at least one engine sensor; comparing the estimated torque output with the measured torque output; and diagnosing a condition of the internal combustion engine in response to the comparison.

According to another aspect, a method includes operating an internal combustion engine system including an intake system connected to an engine with a plurality of cylinders and at least one fuel source operably connected to the internal combustion engine system to provide a flow of fuel to each of the plurality of cylinders. The intake system is coupled to each of the plurality of cylinders to provide a charge flow from the intake system to a combustion chamber of each of the respective cylinders. The internal combustion engine system further includes an exhaust system with an exhaust manifold. The method further includes determining a pressure in the exhaust manifold during a combustion cycle associated with at least one of the plurality of cylinders; determining a BMEP in the exhaust manifold during the combustion cycle of the at least one of the plurality of cylinders; determining a mass charge flow and a spark timing associated with the at least one cylinder during the combustion cycle; determining a modified TOB from a ratio of the BMEP to the mass charge flow; determining an engine out NOx amount for the at least one cylinder in response to the modified TOB, the pressure in the exhaust manifold and the spark timing; and adjusting an operating condition of the at least one engine in response to the engine out NOx amount.

According to another aspect, a system includes an internal combustion engine including a plurality of cylinders and at least one engine sensor and an exhaust system configured to receive exhaust from the plurality of cylinders. The exhaust system includes an exhaust manifold pressure sensor in communication with the exhaust from at least one of the plurality of cylinders. The system also includes an intake system configured to direct a charge flow to the plurality of cylinders and a fuel system including at least one fuel source operable to provide a flow of fuel to the plurality of cylinders. A controller is connected to the internal combustion engine, the at least one engine sensor, and the exhaust manifold pressure sensor. The controller is configured to receive a pressure signal indicative of the exhaust manifold pressure and an engine signal indicative of a BMEP of the at least one cylinder during a combustion cycle associated with at least one cylinder. The controller is further configured to determine an engine out NOx amount for the at least one cylinder in response to the pressure in the exhaust manifold and the BMEP, and adjust an operating condition of the at least one engine in response to the engine out NOx amount.

In one embodiment, the controller is configured to determine a GIMEP of the at least one of the plurality of cylinders in response to the pressure in the exhaust manifold and the BMEP of the at least one cylinder and determine the engine out NOx amount for the at least one cylinder in response to the GIMEP. In a refinement of this embodiment, the controller is configured to determine a mass charge flow and a spark timing associated with the least one cylinder, and the engine out NOx amount is based on a ratio of the GIMEP to the mass charge flow and the spark timing.

In another embodiment, the fuel is selected from the group consisting of natural gas, bio-gas, methane, propane, ethanol, producer gas, field gas, liquefied natural gas, compressed natural gas, or landfill gas. In another embodiment, the controller is configured to adjust at least one of the following in response to the engine out NOx amount: a spark timing in the at least one cylinder in response to the engine out NOx amount and a lambda in the at least one cylinder in response to the engine out NOx amount.

According to another aspect, an apparatus includes an electronic controller operatively connected with an internal combustion engine. The engine includes a plurality of cylinders and is connected to an exhaust manifold configured to receive exhaust from the plurality of cylinders and an intake system configured to direct a charge flow to the plurality of cylinders. The electronic controller is also operatively connected with an exhaust manifold pressure sensor of the exhaust manifold and a fuel system including at least one fuel source operable to provide a flow of fuel into the charge flow to the plurality of cylinders. The electronic controller includes a plurality of modules including: a NOx estimation module configured to determine an engine out NOx amount in response to an exhaust manifold pressure from the exhaust manifold pressure sensor and a BMEP of at least one of the plurality of cylinders and an operation control module configured to adjust operations of the internal combustion engine in response to the engine out NOx amount.

In one embodiment, the NOx estimation module is configured to determine a GIMEP in response to the exhaust manifold pressure and the BMEP. In a refinement of this embodiment, the NOx estimation module is configured to determine a mass charge flow and a spark timing associated with the least one cylinder, and the NOx estimation module is further configured to determine the engine out NOx amount based on a ratio of the GIMEP to the mass charge flow and the spark timing.

In another embodiment, the operation control module is configured to adjust at least one of adjust a spark timing and a lambda in the at least one cylinder of the internal combustion engine in response to the engine out NOx amount.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
operating an internal combustion engine system, the internal combustion engine system including an intake system operably connected to an internal combustion engine comprising a plurality of cylinders and at least one engine sensor, at least one fuel source operably connected to the internal combustion engine and configured to supply a fuel to each of the plurality of cylinders, an exhaust system comprising an exhaust manifold and an exhaust manifold pressure sensor, and a controller operably connected to the at least one engine sensor and the exhaust manifold pressure sensor;
determining a pressure in the exhaust manifold during a combustion cycle associated with at least one cylinder of the plurality of cylinders via the exhaust manifold pressure sensor;
determining a brake mean effective pressure (BMEP) of the at least one cylinder during the combustion cycle via the at least one engine sensor;
determining a gross indicated mean effective pressure (GIMEP) of the at least one cylinder in response to the determined pressure in the exhaust manifold and the determined BMEP of the at least one cylinder;
determining a mass charge flow to the internal combustion engine in response to the determined pressure in the exhaust manifold or via the at least one engine sensor;
determining an estimated engine out NOx amount for the at least one cylinder in response to the determined GIMEP and the determined mass charge flow to the internal combustion engine; and
adjusting an operating condition of the internal combustion engine in response to the determined estimated engine out NOx amount.

2. The method of claim 1, wherein the GIMEP is determined in response to a sum of a pumping mean effective pressure (PMEP) and a net indicated mean effective pressure (NIMEP).

3. The method of claim 2, wherein the PMEP is determined in response to a differential between the pressure in the exhaust manifold and an intake manifold pressure, and the NIMEP is based on the determined BMEP.

4. The method of claim 1, further comprising determining a spark timing associated with the at least one cylinder via the at least one engine sensor, and wherein determining the estimated engine out NOx amount for the at least one cylinder is in response to a ratio of the determined GIMEP to the determined mass charge flow and the determined spark timing.

5. The method of claim 1, further comprising:
comparing the determined estimated engine out NOx amount from the at least one cylinder to an engine out NOx amount threshold, and
wherein the adjusting of the operating condition of the internal combustion engine includes reducing an engine out NOx amount in response to the determined estimated engine out NOx amount exceeding the engine out NOx amount threshold.

6. The method of claim 5, wherein the adjusting of the operating condition of the internal combustion engine includes at least one of:
opening or closing at least one of an intake throttle in the intake system, a compressor bypass valve in a compressor bypass, a waste gate of a turbine in the exhaust system, and a variable geometry turbine inlet in the exhaust system; and
varying a lift profile of at least one of an intake valve and an exhaust valve of the at least one cylinder.

7. The method of claim 1, wherein adjusting the operating condition of the internal combustion engine includes adjusting a spark timing to avoid a knock condition in the at least one cylinder.

8. The method of claim 1, further comprising:
comparing the determined estimated engine out NOx amount from the at least one cylinder to a measured engine out NOx amount from a physical engine out NOx sensor; and
diagnosing a condition of the physical engine out NOx sensor in response to the comparison of the determined estimated engine out NOx amount and the measured engine out NOx amount.

9. The method of claim 8, further comprising:
estimating a torque output of the internal combustion engine in response to the measured engine out NOx amount;

measuring a torque output of the internal combustion engine via the at least one engine sensor;

comparing the estimated torque output with the measured torque output; and diagnosing a condition of the internal combustion engine in response to the comparison of the estimated torque output and the measured torque output.

10. A system, comprising:

an internal combustion engine including a plurality of cylinders and at least one engine sensor for measuring a pressure in at least one cylinder;

an exhaust system configured to receive exhaust from the plurality of cylinders, the exhaust system comprising an exhaust manifold and an exhaust manifold pressure sensor in communication with the exhaust received from the at least one cylinder of the plurality of cylinders for measuring a pressure in the exhaust manifold;

an intake system configured to direct a mass charge flow to the plurality of cylinders;

a fuel system including at least one fuel source operably connected to the internal combustion engine and configured to supply a fuel to each of the plurality of cylinders; and a controller operably connected to the at least one engine sensor and the exhaust manifold pressure sensor, wherein the controller is configured to:

receive a pressure signal indicative of the pressure in the exhaust manifold from the exhaust manifold pressure sensor and an engine signal indicative of a brake mean effective pressure (BMEP) of the at least one cylinder from the at least one engine sensor during a combustion cycle associated with the at least one cylinder, determine a gross indicated mean effective pressure (GIMEP) of the at least one cylinder in response to the received signal indicative of the pressure in the exhaust manifold and the received signal indicative of the BMEP of the at least one cylinder, determine the mass charge flow to the plurality of cylinders in response to the received signal indicative of the pressure in the exhaust manifold or via the at least one engine sensor, determine an estimated engine out NOx amount for the at least one cylinder in response to the determined GIMEP and the determined mass charge flow to the plurality of cylinders, and adjust an operating condition of the internal combustion engine in response to the determined estimated engine out NOx amount.

11. The system of claim 10, wherein the controller is further configured to determine a spark timing associated with the at least one cylinder via the at least one engine sensor, and the determined estimated engine out NOx amount for the at least one cylinder is in response to a ratio of the determined GIMEP to the determined mass charge flow and the determined spark timing.

12. The system of claim 10, wherein the fuel is selected from the group consisting of natural gas, bio-gas, methane, propane, ethanol, producer gas, field gas, liquefied natural gas, compressed natural gas, and landfill gas.

13. The system of claim 10, wherein the controller is further configured to adjust at least one of the following in response to the determined estimated engine out NOx amount:

a spark timing in the at least one cylinder; and a lambda value in the at least one cylinder.

14. An apparatus, comprising:

an electronic controller operatively connected with an internal combustion engine including a plurality of cylinders and at least one engine sensor, an exhaust system comprising an exhaust manifold and an exhaust manifold pressure sensor, an intake system, and a fuel system including at least one fuel source, wherein the electronic controller comprises a plurality of modules including:

a NOx estimation module configured to determine an estimated engine out NOx amount for at least one cylinder of the plurality of cylinders based on a gross indicated mean effective pressure (GIMEP) and a mass charge flow to the internal combustion engine, the GIMEP determined in response to a pressure in the exhaust manifold determined via the exhaust manifold pressure sensor and a brake mean effective pressure (BMEP) of the at least one cylinder determined via the at least one engine sensor, and the mass charge flow determined in response to the determined pressure in the exhaust manifold or via the at least one engine sensor; and an engine operation control module configured to adjust operations of the internal combustion engine in response to the determined estimated engine out NOx amount.

15. The apparatus of claim 14, wherein the NOx estimation module is further configured to determine a spark timing associated with the at least one cylinder, and wherein the determined estimated engine out NOx amount for the at least one cylinder is in response to a ratio of the determined GIMEP to the determined mass charge flow and the determined spark timing.

16. The apparatus of claim 14, wherein the engine operation control module is further configured to at least one of adjust a spark timing and a lambda value in the at least one cylinder of the internal combustion engine in response to the determined estimated engine out NOx amount.

* * * * *